United States Patent
Sun (10) Patent No.: US 8,213,172 B2
(45) Date of Patent: Jul. 3, 2012

(54) HARD DISK MOUNTING DEVICE

(75) Inventor: Zheng-Heng Sun, Taipei Hsien (TW)

(73) Assignee: Hon Hai Precision Industry Co., Ltd., Tu-Cheng, New Taipei (TW)

(*) Notice: Subject to any disclaimer, the term of this patent is extended or adjusted under 35 U.S.C. 154(b) by 180 days.

(21) Appl. No.: 12/818,119

(22) Filed: Jun. 17, 2010

(65) Prior Publication Data

US 2011/0188194 A1 Aug. 4, 2011

(30) Foreign Application Priority Data

Jan. 30, 2010 (CN) .......................... 2010 1 0300987

(51) Int. Cl.
*G06F 1/16* (2006.01)
(52) U.S. Cl. .................................. 361/679.33
(58) Field of Classification Search ............. 361/679.33, 361/679.35
See application file for complete search history.

(56) References Cited

U.S. PATENT DOCUMENTS

| | | | |
|---|---|---|---|
| 6,317,318 B1* | 11/2001 | Kim .......................... | 361/679.33 |
| 6,580,606 B1* | 6/2003 | Leman ..................... | 361/679.33 |
| 7,495,907 B2* | 2/2009 | Peng et al. ............... | 361/679.33 |
| 7,839,629 B2* | 11/2010 | Yeh .......................... | 361/679.37 |
| 2006/0007650 A1* | 1/2006 | Shim .......................... | 361/685 |
| 2011/0255235 A1* | 10/2011 | Chen ........................ | 361/679.33 |
| 2011/0267762 A1* | 11/2011 | Sun .......................... | 361/679.33 |

\* cited by examiner

*Primary Examiner* — Lisa Lea Edmonds
(74) *Attorney, Agent, or Firm* — Altis Law Group, Inc.

(57) ABSTRACT

A hard disk mounting device for fixing two hard disks with fixing members includes a pedestal, and two latching members. The pedestal includes a bottom plate, and two side plates extending from the bottom plate. Each side plate includes a first mounting portion and two second mounting portions extending from opposite ends of the first mounting portion. Each first mounting portion includes a first receiving portion. Each second mounting portion defines two latching grooves to receive corresponding fixing members of the hard disks. Each latching member includes a first engaging portion to resist against a corresponding hard disk, and two first latching portions protruding from opposite ends of the first engaging portion. One latching portion includes a first fixing portion received in the first receiving portion and a second receiving portion, the other latching portion includes a second fixing portion received in the second receiving portion.

15 Claims, 7 Drawing Sheets

HARD DISK MOUNTING DEVICE

BACKGROUND

1. Technical Field

The present disclosure relates to a hard disk mounting device.

2. Description of Related Art

Generally speaking, when a computer is assembled, hard disks are attached to a hard disk mounting device, and then the hard disk mounting device is mounted in a computer enclosure. However, during installation or removal of the hard disk mounting device, the hard disk mounting device needs extra space to slide in the computer enclosure, which occupies greater space of the computer enclosure. Moreover, the structure of the hard disk mounting device is often extremely complex.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure, including the accompanying drawings, is illustrated by way of examples and not by way of limitation. It should be noted that references to "an" or "one" embodiment in this disclosure are not necessarily to the same embodiment, and such references mean at least one.

Figure 1:
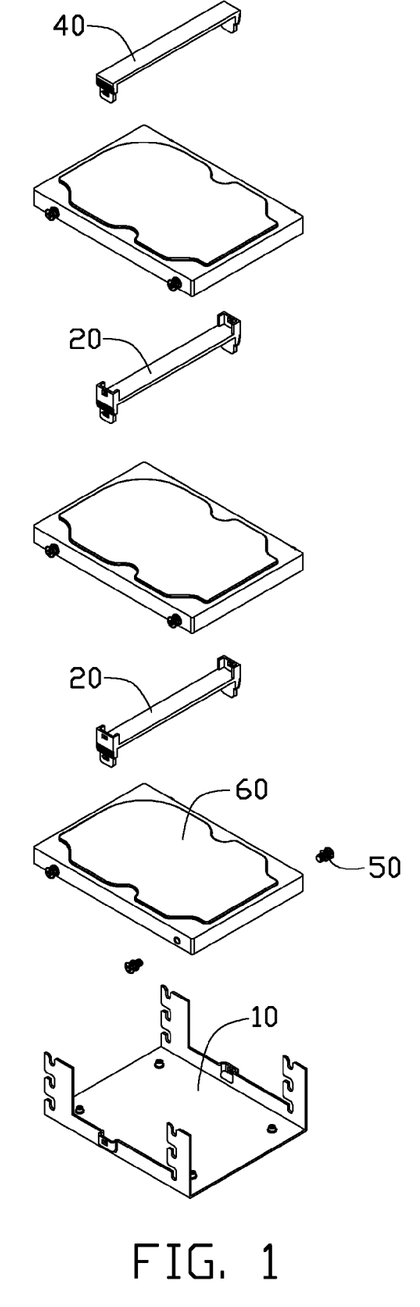
FIG. 1 is an exploded, isometric view of an exemplary embodiment of a hard disk mounting device with three hard disks, the hard disk mounting device including a pedestal, two first latching members, a second latching member, and a plurality of fixing members. Fixing members for example may be fasteners as described here.

Referring to FIG. 1, an exemplary embodiment of a hard disk mounting device for mounting hard disks 60 includes a pedestal 10, two first latching members 20, a second latching member 40, and a plurality of fixing members 50. In the embodiment, the number of the hard disks 60 is three.

Figure 2:
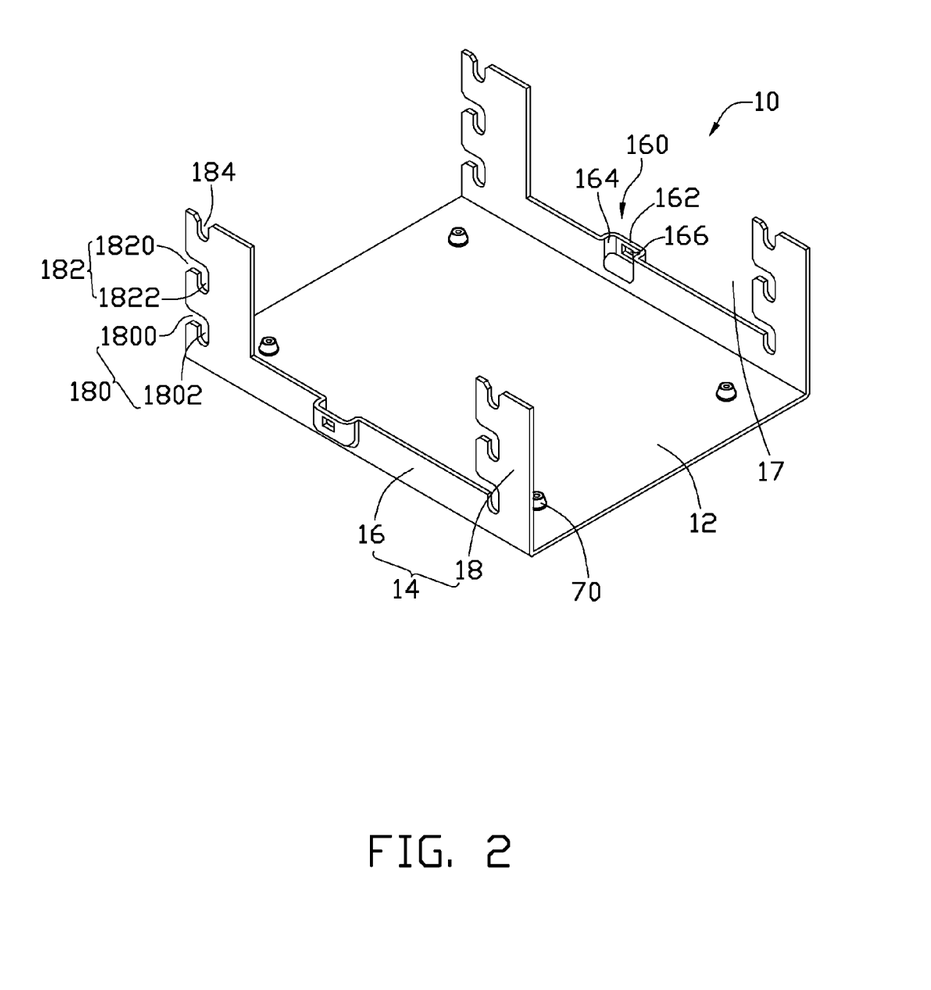
FIG. 2 is an enlarged view of the pedestal of FIG. 1.

Referring to FIG. 2, the pedestal 10 includes a bottom plate 12 and two side plates 14 perpendicularly extending up from opposite sides of the bottom plate 12. A plurality of screw posts 70 extend up from the bottom plate 12. Each screw post 70 defines a screw hole (not labeled) to mount the pedestal 10 in a chassis (not shown) of a computer or a server. The side plates 14 each include a bar-shaped first mounting portion 16 and two bar-shaped second mounting portions 18 perpendicularly extending from opposite ends of the first mounting portion 16. The first mounting portion 16 and the second mounting portions 18 are separated by an opening 17. The centers of the first mounting portions 16 have depressions pressed out to form a receiving portion 160 from the inner surface of the first mounting portion 16. The receiving portion 160 includes a first tab 162 apart from and parallel to the side plate 14, and two second tabs 164 extending from opposite sides of the first tab 162 and connected to the side plate 14. The first tab 162 defines a rectangular latching hole 166.

The second mounting portions 18 each define a first latching groove 180, a second latching groove 182, and a third latching groove 184. The first to third latching grooves 180, 182, and 184 are arranged in a line from a bottom to a top of each second mounting portion 18. The first to third latching grooves 180, 182, and 184 of one second mounting portion 18 of each side plate 14 are defined in a side of the second mounting portion 18, opposite to the opening 17, the first to third latching grooves 180, 182, and 184 of the other second mounting portion 18 of each side plate 14 are defined in a side of the second mounting portion 18, facing the opening 17. The first latching groove 180 is L-shaped and includes a horizontal entrance 1800 extending through the edge of the second mounting portion 18 and a vertical position portion 1802 extending down from the entrance 1800. The second latching groove 182 is L-shaped and includes a horizontal entrance 1820 and a vertical position portion 1822 extending down from the entrance 1820. The third latching groove 184 is C-shaped and defined in a top of the second mounting portion 18.

Figure 3:
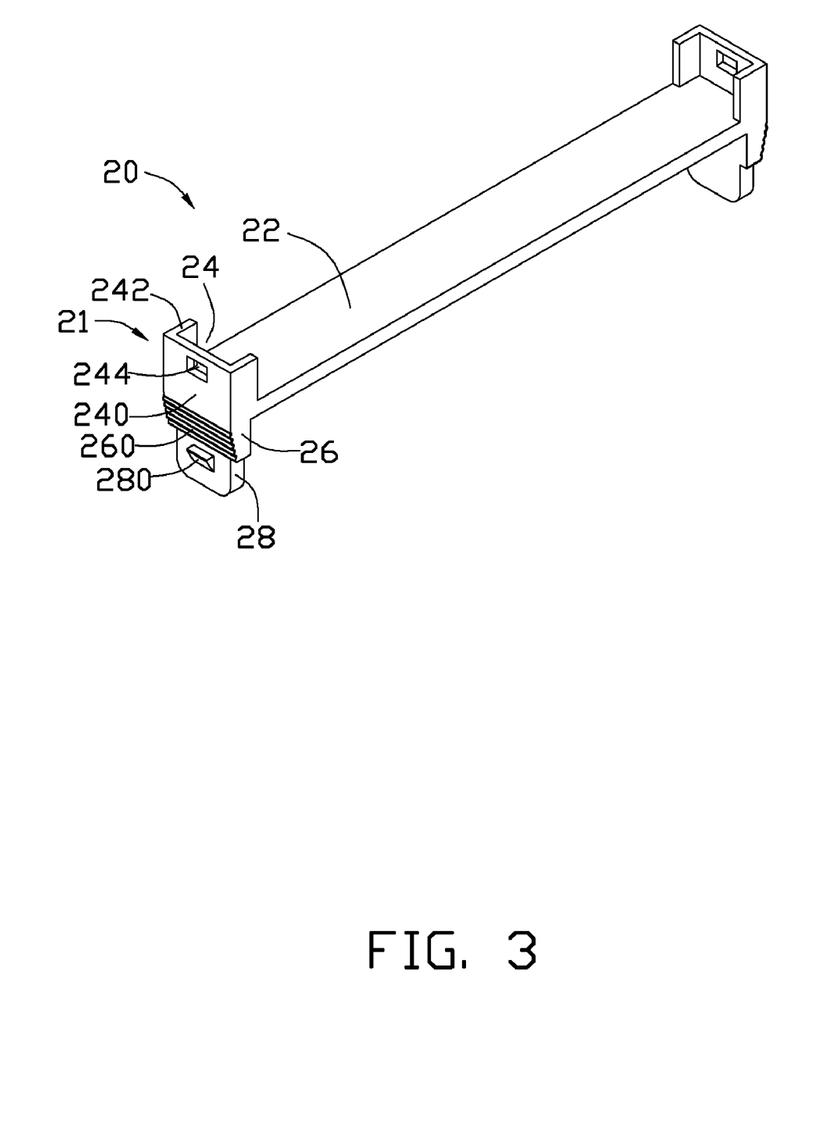
FIG. 3 is an enlarged view of one first latching member of FIG. 1.

Referring to FIG. 3, the first latching members 20 each are H-shaped and include a bar-shaped engaging portion 22, two latching portions 21 extending from opposite ends of the engaging portion 22. The latching portions 21 each include a U-shaped receiving portion 24 perpendicularly extending up from the engaging portion 22, an operating portion 26 perpendicularly extending down from the engaging portion 22, and a fixing portion 28 extending down from the bottom of the operating portion 26, away from the receiving portion 24.

The receiving portion 24 includes a first tab 240 facing the engaging portion 22 and two second tabs 242 perpendicularly extending from opposite ends of the first tab 240. The first tab 240 defines a rectangular latching hole 244. The operating portion 26 defines a plurality of grip strips 260 on an outer surface opposite to the engaging portion 22. A wedge-shaped protrusion extends from an outer surface of the fixing portion 28, opposite to the engaging portion 22.

Figure 4:
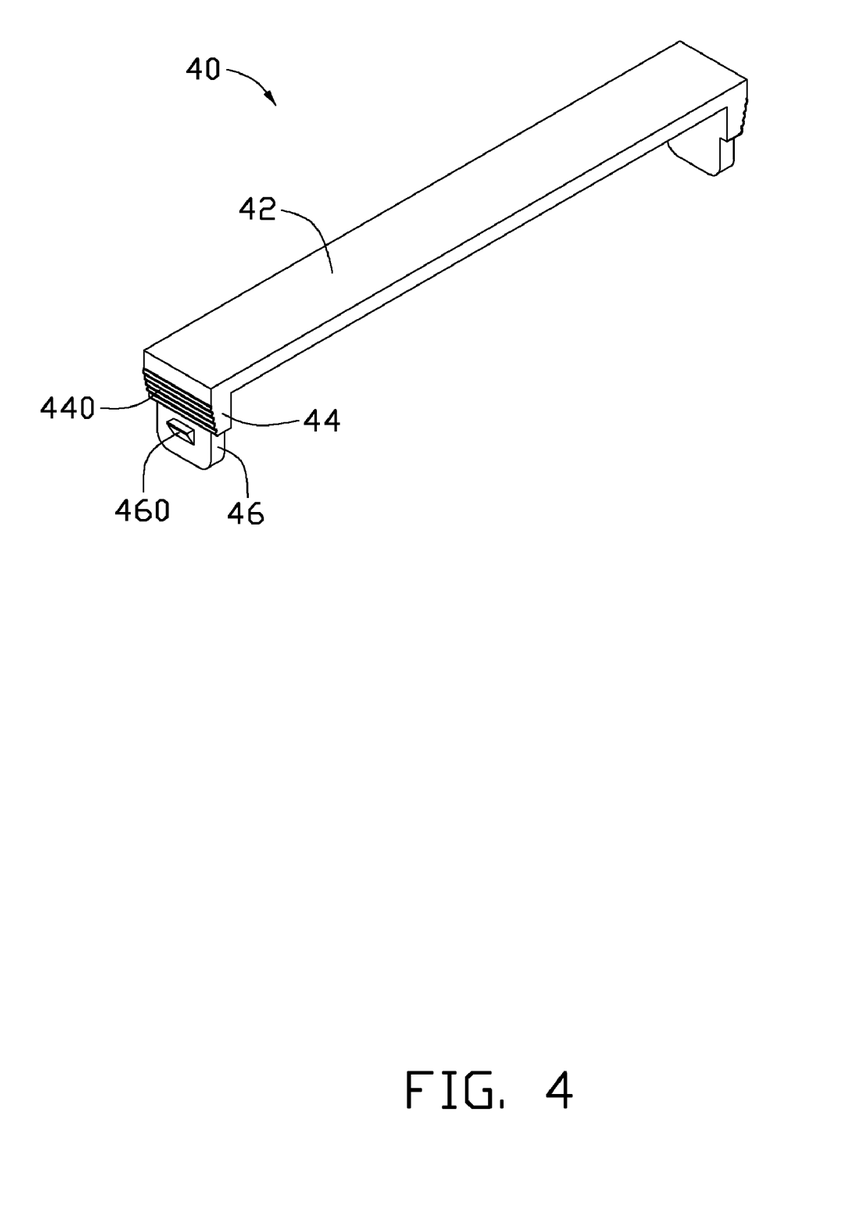
FIG. 4 is an enlarged view of the second latching member of FIG. 1.

Referring to FIG. 4, the second latching member 40 includes a bar-shaped engaging portion 42 and two latching portions extending from opposite ends of the engaging portion 42. Each latching portion of the second latching member 40 includes an operating portion 44 perpendicularly extending down from the engaging portion 42, and a fixing portion 46 extending down from a bottom of the operating portion 44. The operating portion 44 defines a plurality of grip strips 440 on an outer surface opposite to the engaging portion 42. A wedge-shaped protrusion 460 extends from an outer surface of the fixing portions 46, opposite to the engaging portion 42.

Figure 5:
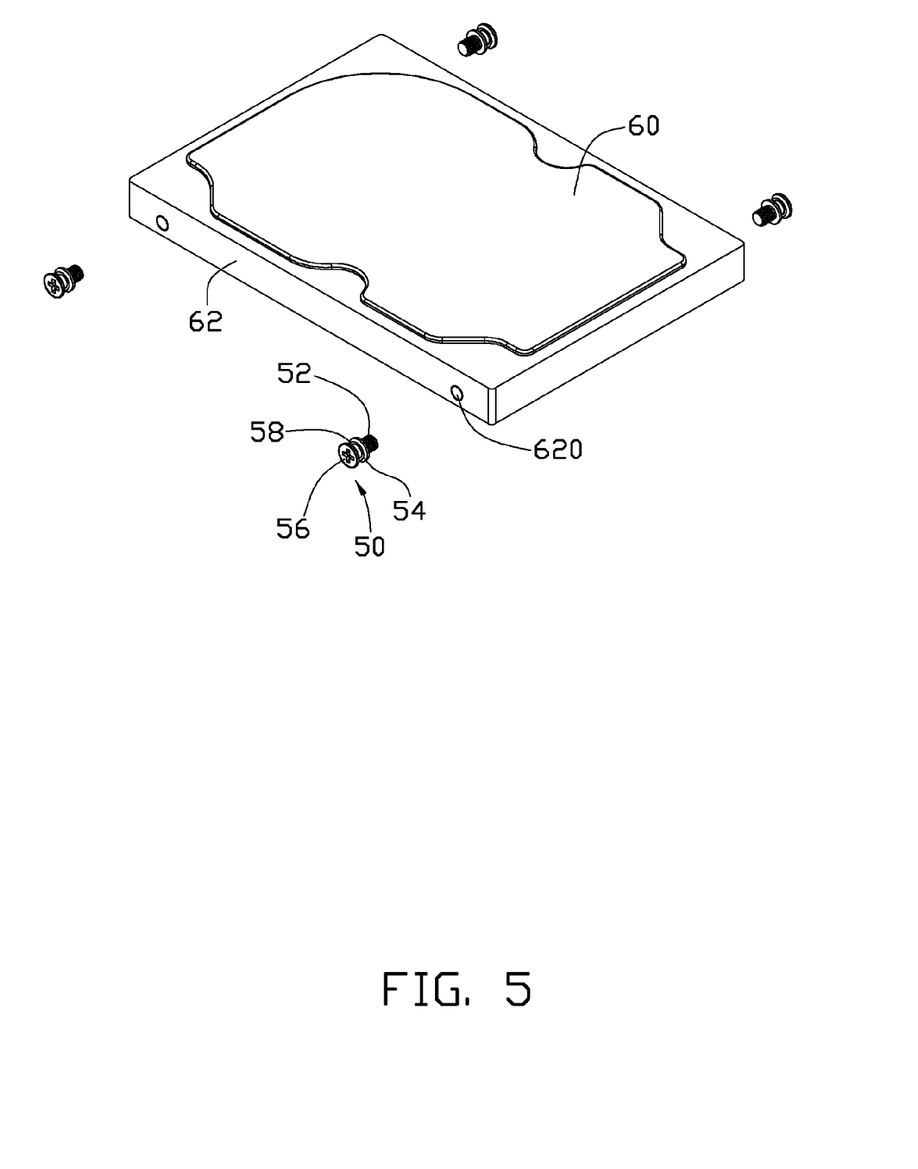
FIG. 5 is an enlarged view of the fasteners and one hard disk of FIG. 1.

Referring to FIG. 5, each fastener 50 includes a threaded rod 52, a head 56, and a circular flange 54 between the head 56 and the threaded rod 52. A sliding slot 58 is defined in the fastener 50 between the head 56 and the flange 54.

Each hard disk 60 includes two opposite sidewalls 62. Each sidewall 62 defines two mounting holes 620, such as screw holes.

Figure 6:
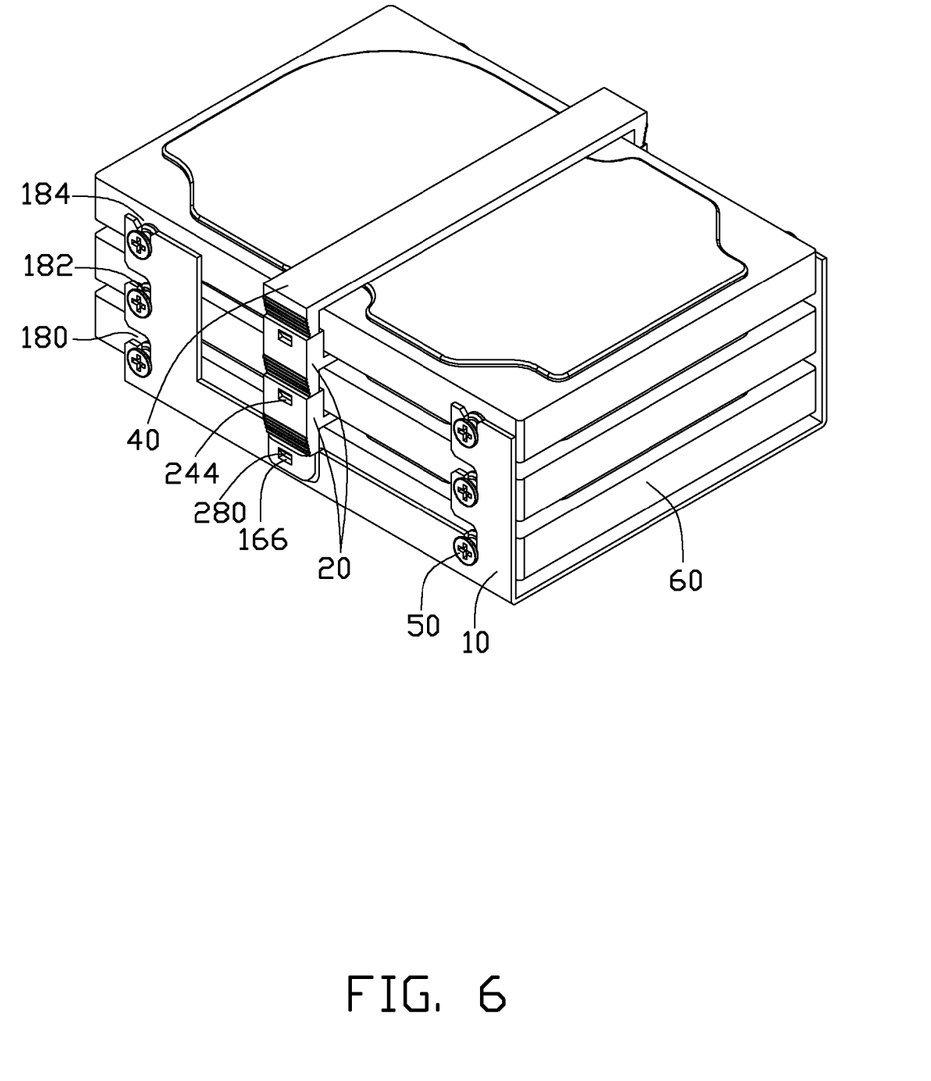
FIG. 6 is an assembled view of FIG. 1.

Referring to FIG. 6, in assembly, four fixing members 50 are fixed the sidewalls 62 of each hard disk 60, with the threaded rods 52 engaging in the mounting holes 620. A first one of the hard disks 60 is placed on the bottom plate 12, with four fasteners 50 sliding into the four first latching grooves 180 through the four entrances 1800, until the fasteners 50 slide into the four position portions 1802. In this process, the sliding slots 58 of the fasteners 50 seat within the first latching grooves 180. One first latching member 20 is attached to a top of the first hard disk 60. The fixing portions 28 of the first latching member 20 are received in the receiving portions 160 of the first mounting portions 16 of the pedestal 10, with the protrusions 280 engaged in the latching holes 166, and the engaging portion 22 resisting against the top of the first hard disk 60.

A second one of the hard disks 60 is placed on the engaging portion 22 of the first latching member 20 resisting against the first hard disk 60, with four fasteners 50 of the second hard disk 60 sliding into the four second latching grooves 182 through the four entrances 1820, until the fasteners 50 slide into the four vertical position portions 1822. In this process, the sliding slots 58 of the fasteners 50 seat within the second latching grooves 182. The other first latching member 20 is attached to a top of the second hard disk 60. The fixing portions 28 of the first latching member 20 are received in the receiving portions 24 of the first latching member 20 resisting against the top of the first hard disk 60, with the protrusions 280 engaged in the latching holes 244 of the first latching member 20 resisting against the first hard disk 60, and the engaging portion 22 resisting against the top of the second hard disk 60.

A third one of hard disk 60 is placed on the engaging portion 22 of the first latching member 20 resisting against the second hard disk 60, with four fasteners 50 of the third hard disk 60 engaging in the third latching grooves 184, and the sliding slots 58 of the fixing members 50 seat within the third latching grooves 184. The second latching portion 40 is attached to a top of the third hard disk 60. The fixing portions 46 of the second latching member 40 are received in the two receiving portions 24 of the first latching member 20 resisting against the top of the second hard disk 60, with the protrusions 460 of the second latching portion 40 engaged in the latching holes 244 of the first latching member 20 resisting against the top of the second hard disk 60, and the engaging portion 42 resisting against the top of the third hard disk 60.

In disassembly, the grip strips 440 of the second latching member 40 are pressed to deform to disengage the protrusions 460 from the latching holes 244 of the first latching member 20 resisting against the top of the second hard disk 60, thereby the second latching member 40 can be removed. Similarly, the first latching members 20 can be removed conveniently.

In assembly or disassembly, the grip strips 260 and the grip strips 440 can increase stabilization for the hard disks and provide grip assistance for easier assembly and disassembly, which is very convenient.

In other embodiments, if the computer or the server has larger vertical space, the second latching member 40 can be replaced by the first latching members 20, and the second portions 18 can be extended, and more first latching members 20 may be subsequently added to install more hard disks 60.

Figure 7:
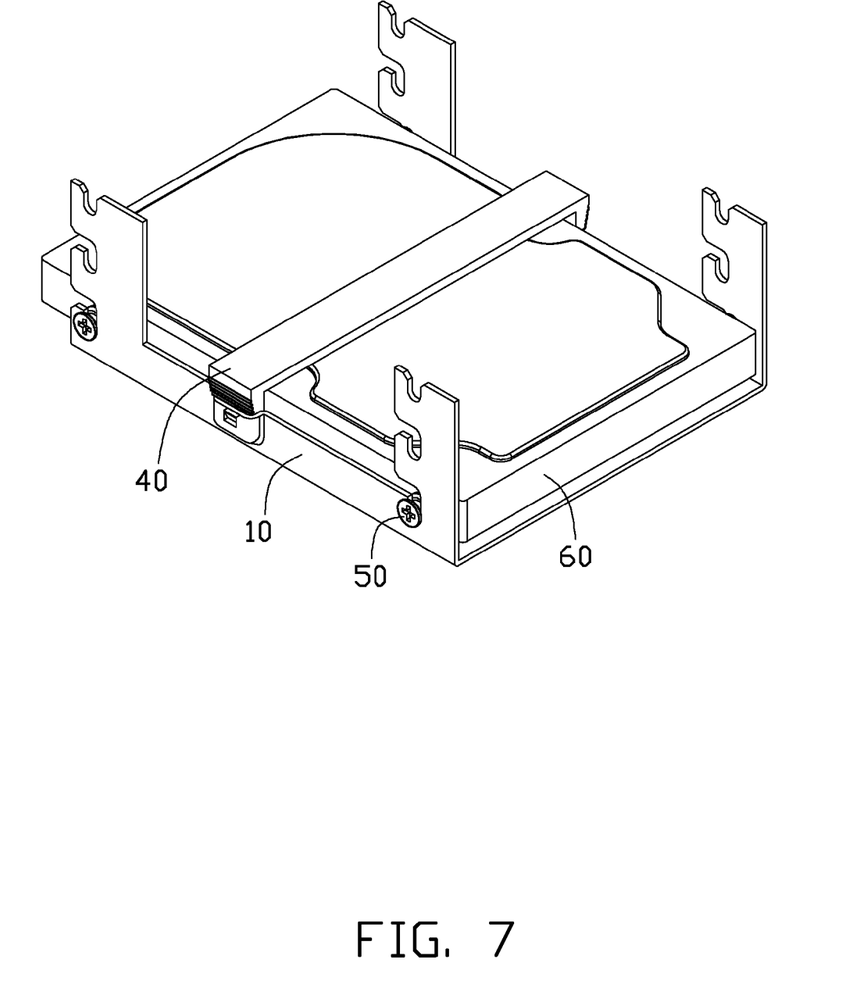
FIG. 7 is an assembled view of the pedestal, one hard disk, some fasteners, and the second latching member.

Referring to FIG. 7, when the hard disk mounting device needs to install one hard disk 60 only, the hard disk 60 is placed on the bottom plate 12, four fixing members 50 sliding into the four first latching grooves 180 through the four entrances 1800, until the fixing members 50 slide into the four position portions 1802. The second latching member 40 is attached to the top of the hard disk 60. The fixing portions 46 of the second latching member 40 are received in the two receiving portions 160, with the protrusions 460 engaged in the latching holes 166, and the engaging portion 42 resisting against the top of the hard disk 60.

It is to be understood, however, that even though numerous characteristics and advantages of the present disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A hard disk mounting device for fixing two hard disks with a plurality of fixing members protruding from opposite sidewalls of the hard disks, the hard disk mounting device comprising:
    a pedestal comprising a bottom plate to support a first one of the hard disks and two side plates perpendicularly extending from opposite sides of the bottom plate, the side plates each comprising a first mounting portion and two second mounting portions extending from opposite ends of the first mounting portion, each first mounting portion comprising a first receiving portion defining a first latching hole, and the second mounting portions each defining two latching grooves to receive corresponding fixing members of the hard disks;
    a first latching member comprising a first engaging portion to resist against a top of the first hard disk, and two first latching portions protruding from opposite ends of the first engaging portion, each first engaging portion comprising a second receiving portion defining a second latching hole, and a first fixing portion received in the first receiving portion of the pedestal, a first protrusion extending from the first fixing portion to engage in one of the first latching holes of the pedestal; and
    a second latching member comprising a second engaging portion to resist against a top of a second hard disk on the first latching member, and two second latching portions protruding from opposite ends of the second engaging portion, each second engaging portion comprising a second fixing portion received in the second receiving portion of the first latching member, a second protrusion extending from the second engaging portion to engage in one of the second latching holes of the first latching member.

2. The hard disk mounting device of claim 1, further comprising a third latching member, wherein the third latching member engages with the second latching member, to fix a third hard disk on the second latching member.

3. The hard disk mounting device of claim 2, wherein each second engaging portion of the second latching member further comprises a third receiving portion defining a third latching hole, the third latching member comprises a third engaging portion for resisting against the third hard disk, and two third latching portions extending from opposite ends of the third engaging portion, each third latching portion comprises a third fixing portion received in the third receiving portion of the second latching member.

4. The hard disk mounting device of claim 3, wherein a third protrusion extends from the third fixing portion on an outer surface opposite to the second engaging portion, for engaging in one of the third latching holes of the second latching member.

5. The hard disk mounting device of claim 4, wherein each of the first to third latching portions further comprises an operating portion perpendicularly extending from a corresponding end of the corresponding engaging portion, wherein the corresponding fixing portions extend from bottoms of the operating portions, each operating portion defines a plurality of grip strips.

6. The hard disk mounting device of claim 1, wherein a center of the first mounting portion has depressions pressed out to form the first receiving portion, the first receiving portion comprises a first tab apart from and parallel to the first mounting portion, and two second tabs extending from opposite ends of the first tab to connect to the first mounting portion, the first latching hole is defined in the first tab.

7. The hard disk mounting device of claim 1, wherein the second receiving portion comprises a first tab facing the first engaging portion, and two second tabs extending from opposite ends of the first tab, the second latching hole is defined in the first tab.

8. The hard disk mounting device of claim 1, wherein the first and second latching holes are both rectangular, and the first and second protrusions are wedge-shaped.

9. The hard disk mounting device of claim 1, wherein each second mounting portion defines a first latching groove, and a second latching groove, the first and second latching grooves are both L-shaped and each comprise an entrance for the corresponding fixing member sliding through and a position portion for positioning the corresponding fixing member.

10. The hard disk mounting device of claim 1, wherein the first latching portion further comprises an operating portion between the first receiving portion and the first fixing portion, wherein the operating portion defines a plurality of grip strips on an outer surface.

11. A hard disk mounting device for fixing a hard disk with two fixing members protruding from each sidewall of the hard disk, the hard disk mounting device comprising:

a pedestal comprising a bottom plate to support the hard disk and two side plates perpendicularly extending from opposite sides of the bottom plate, each side plate comprising a first mounting portion and a second mounting portion extending from opposite ends of the first mounting portion, each first mounting portion comprising a receiving portion defining a latching hole, and the second mounting portions each defining a latching groove to receive the fixing members of a corresponding sidewall of the hard disk; and a latching member comprising an engaging portion to resist against a top of the hard disk, and two latching portions protruding from opposite ends of the engaging portion, each latching portion comprising an operating portion defining a plurality of grip strips on an outer surface and extending from the corresponding end of the engaging portion, and a fixing portion extending from a distal end of the operating portion to be received in the receiving portion of the pedestal, a protrusion extending from an outer surface of the first fixing portion to engage in one of the latching holes of the pedestal.

12. The hard disk mounting device of claim 11, wherein a center of the first mounting portion is depressed out to form the receiving portion, the receiving portion comprises a first tab apart from and parallel to the first mounting portion, and two second tabs extending from opposite ends of the first tab to connect to the first mounting portion, the latching hole is defined in the first tab.

13. The hard disk mounting device of claim 11, wherein the latching hole is rectangular, and the protrusion is wedge-shaped.

14. The hard disk mounting device of claim 11, wherein the latching groove is L-shaped and comprises an entrance for the corresponding fixing member sliding through and a position portion for positioning the corresponding fixing member.

15. The hard disk mounting device of claim 11, wherein the latching groove is defined in a top of each second mounting portion.

* * * * *